Nov. 30, 1948.  K. A. SWANSTROM  2,455,145
FASTENER
Filed July 26, 1944  2 Sheets-Sheet 1
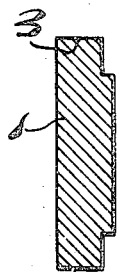
Fig. 1.
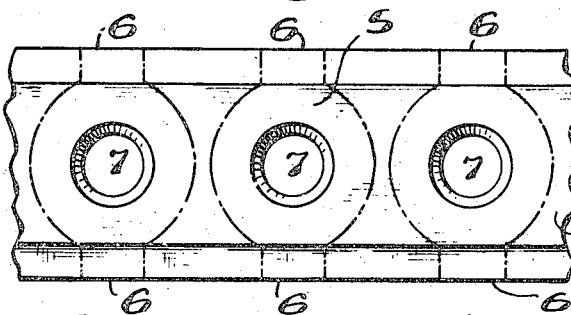
Fig. 2.
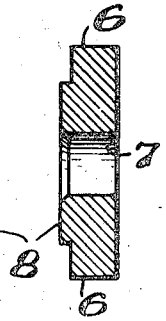
Fig. 3.
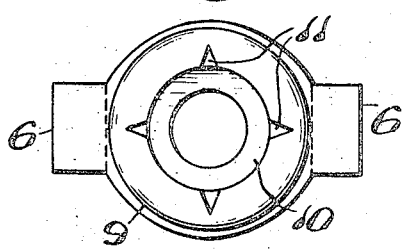
Fig. 4.
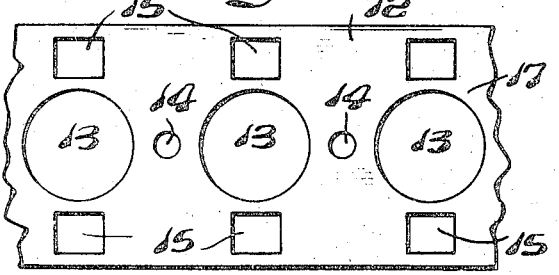
Fig. 6.
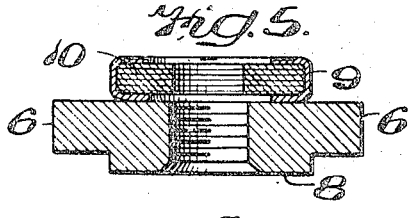
Fig. 5.
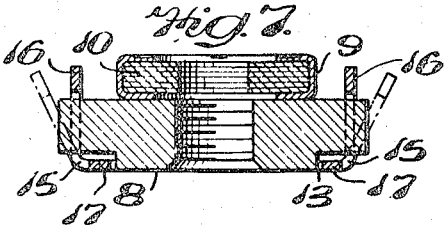
Fig. 7.
Fig. 8.
Fig. 9.
INVENTOR.
KLAS ARENT SWANSTROM
BY
ATTORNEY

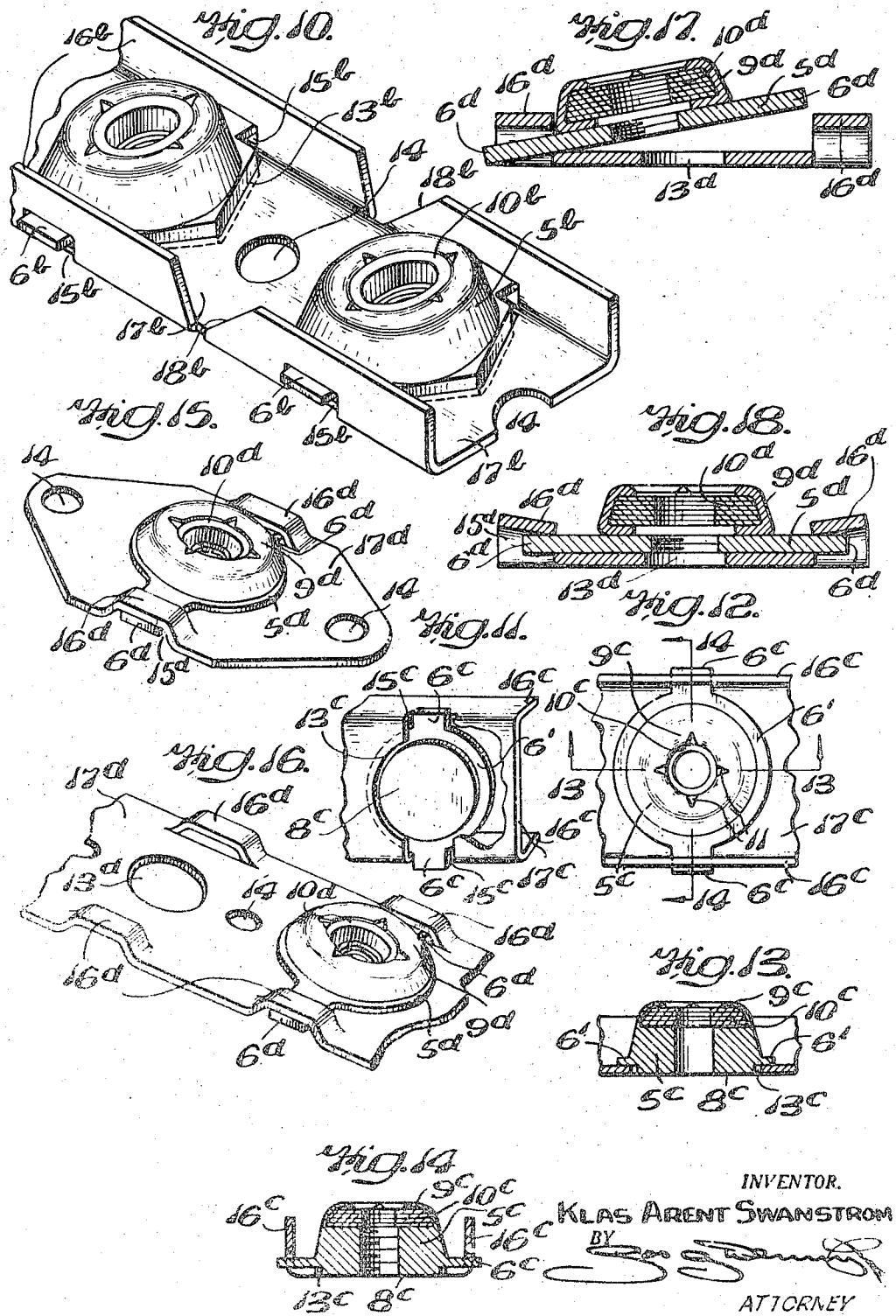

Patented Nov. 30, 1948

2,455,145

UNITED STATES PATENT OFFICE 2,455,145

FASTENER

Klas Arent Swanstrom, Buckingham Township, Bucks County, Pa.

Application July 26, 1944, Serial No. 546,660

5 Claims. (Cl. 85—32)

My invention relates to fasteners of the type in which a stop nut having laterally projecting lugs is attached to a support by a retainer having bent edge sections forming eyes for the reception of lugs on the nut to permit free adjustment or frictional adjustment of the nut axis relatively to the axis of a bolt hole in the support to facilitate insertion of a bolt into the nut.

In the preferred embodiment of my invention, the base of the nut projects through an aperture in the bottom of the retainer into direct abutting engagement with the surface of the support to which the retainer is attached by riveting or welding. Such direct abutting engagement minimizes ingress of moisture and corrosion and provides a firmer connection than is attainable where a retainer is interposed between the nut and support.

The eyes of the retainer may be completely enclosed and limit axial movements of lugs, and hence of the nut, in both directions, or the eyes may have open bottoms, in which event disengagement of the lugs from the retainer through such openings may be prevented by the engagement of rim members on the nut with the top surface of the retainer base.

The lugs are preferably spaced axially from the bottom surface of the nut body sufficiently to permit such surface to lie substantially flush with the bottom surface of the retainer when nut and retainer are assembled. When the bottom surfaces of nut and retainer are substantially flush, the lugs preferably engage the members bounding the top of the retainer eyes so as to frictionally retard rotary or lateral movements of the nut.

The stop nuts may be cut from solid stock on an automatic screw machine but preferably nut bodies with integral lugs are stamped from a rolled strip having a central section equal in width to the desired diameter of the nut body, and of greater thickness than the edge sections from which lugs are stamped simultaneously with the stamping out of a nut body and integral therewith.

A locking collar may be seated in a recess cut in the nut body and held by an overturned staked edge, or may be seated in an annular holder having radial flanges, one of which is bonded to the nut body and on which the collar rests.

The characteristics and advantages of my improvements will further appear from the following description and the accompanying drawings in illustration thereof.

In the drawings, Fig. 1 is a transverse sectional view of a metal strip having a thick center section and thin edge sections from which nut bodies with diametral lugs may be punched in accordance with my invention; Fig. 2 is a fragmentary bottom view of the strip shown in Fig. 1 illustrating diagrammatically the punching therefrom of nut bodies having diametral lugs; Fig. 3 is a transverse sectional view of a nut body punched from the strip of Fig. 2; Fig. 4 is a top plan view of a stop nut made from the body of Fig. 3 by welding to the top thereof an annular shell of channel shape across section containing a locking collar; Fig. 5 is a transverse sectional view of the nut shown in Fig. 4; Fig. 6 is a plan view, on a reduced scale, of a punched sheet metal blank for forming a retainer for a nut, such as shown in Figs. 1 to 5; Fig. 7 is a transverse sectional view through a nut, such as shown in Fig. 5, positioned in a retainer formed by bending the side edges of the strip shown in Fig. 6 transversely to the intermediate section or base thereof; Fig. 8 is a perspective view of a modified form of retainer and stop nut embodying my invention; Fig. 9 is a transverse sectional view of the retainer and an end view of the stop nut shown in Fig. 8; Fig 10 is a perspective view illustrating a further modification of the retainer shown in Figs. 8 and 9; Fig. 11 is a perspective bottom view of a modified form of nut and retainer embodying my invention; Fig. 12 is a top plan view of the nut and retainer shown in Fig. 11; Fig. 13 is a longitudinal sectional view taken on the line 13—13 of Fig. 12; Fig. 14 is a transverse sectional view taken on the line 14—14 of Fig. 12; Figs. 15 and 16 are perspective views of modified forms of nut and retainers embodying certain features of my invention; Fig. 17 is a diagrammatic transverse sectional view illustrating a method inserting a nut into the retainer of Fig. 15 or Fig. 16; and Fig. 18 is a transverse sectional view through the nuts and retainers shown in Figs. 15 and 16.

As illustrated in Figs. 1, 2 and 3 of the drawings, a strip of metal 1, having side flanges 2 and 3, has punched therefrom nut bodies 5 having diametral projecting lugs 6 and a central aperture 7 which is countersunk at one end. The median thicker portion of the member 1 provides a base or hub 8 projecting beyond the proximate surfaces of the lugs 6.

After the bore of a body 5 is threaded, an annular shell or holder 9 of channel shaped cross section may be welded to the body opposite to the base 8.

A fibre locking collar 10 is secured in the holder 9 before or after the welding thereof to the body. The collar contains an unthreaded bore having an axis in axial alignment with the axis of the bore of the nut. The bore of the collar is substantially the same in diameter as the root of the thread of the unit. The collar 10 rests on the lower radial flange of the shell 9 which is bonded to the body 5 and the complementary upper flange of the shell may be indented as at 11 to stake the collar 10 and prevent rotation thereof.

A strip of sheet material 12, such as metal, fibre or plastic, has punched therefrom aligned round, median, apertures 13 each having a diameter slightly larger than the diameter of a base 8. Rivet holes or welding pimples 14 may be formed between the apertures 13.

Apertures 15 of somewhat greater width than the lugs 6, are punched on the opposite sides of each aperture 13 so as to form eyes receiving the lugs 6 when the edge sections 16 of the strip 12 are bent transversely to the center section or base 17 thereof to form a retainer of channel-shape cross section around a series of nuts as shown in Fig. 7.

Each hub 8 projects through an aperture 13 so that a bolt threaded therein may draw the bottom of the hub directly against a support or structural member to which the retainer base 17 may be affixed by rivets passing through the apertures 14 or by welding.

The metal excised from the base of the retainer substantially reduces the weight thereof and since the substance of which the retainer is composed is not subjected to any of the stresses between the tightened bolt and nut, the retainer may be made of softer and lighter substances, such as aluminum or fibre, than is practicable where a retainer base is interposed between a nut and support. This further lightening of the fastener is of particular advantage in airplane constructions embodying many thousand such fasteners.

Sufficient play is provided between the edges of a base or hub 8 and aperture 13 and between the sides of the lugs 6 and sides of apertures 15 to permit a desired range of lateral and rotary adjustment of the position of the nut relative to the retainer.

If desired, the nut and retainer may be so proportioned that when the bottom surface of the nut is flush with the bottom surface of the retainer or abuts against a member to which the retainer is attached, the top surfaces of the lugs 8 frictionally engage the surfaces of the edges forming the upper rims of the apertures 15 so as to exert a yielding frictional restraint on the lateral and rotary movements of the nut.

Instead of forming a stop nut embodying my invention by welding a collar holder to a body having laterally projecting lugs with an axially protruding base or boss between them, as above described, the nut may be formed on an automatic screw machine from suitable bar stock. Nuts so formed have an integrally connected body 5a, radial lugs 6a, axially projecting base or boss 8a, and overturned lip 9a securing the locking collar 10a, as shown in Figs. 8 and 9.

As shown in Fig. 8, the retainer's side walls 16a may be laterally indented or bowed inward at 18a adjacent to apertures 15a to limit the lateral shift of the nuts and permit the use of wider slots 15a and greater rotary adjustment of the nuts without danger of the lugs 6a being pushed out of the eyes 15a.

In the embodiment of my invention illustrated in Fig. 10a retainer of channel like cross section, generally similar to that shown in Fig. 7, has its base 17b provided with polygonal apertures 13b to receive the polygonal bases or hubs 8b of stop nuts having internally threaded bodies 5b containing locking collars 10b. Lugs 6b project laterally from the nuts between the bases and collars and are inserted in slots 15b in the side walls 18b of the retainer. The engagement of the polygonal bases in the polygonal recesses supplements the engagement of the lugs 6b with the edges of the slots 15b to limit or resist the axial turning of the nuts. The walls 16b may be indented by V-notches 18b between the nuts to facilitate flexing of the retainer or bending it around corners.

In the embodiment of my invention illustrated in Figs. 11 to 14, inclusive, the retainer consists of a channel member having a base 17c and side walls 16c bent transversely thereto. The base and side walls contain communicating apertures 13c and 15c, the latter providing eyes having open bottoms for the reception of nut lugs.

The stop nut used with such retainer preferably comprises (Figs. 13, 14) a body 5c having laterally extending lugs 6c, a base or bottom boss 8c, a lip 9c securing a locking collar 10c, and a peripheral head or flange 6' larger than the aperture 13c and spaced axially from the bottom surface of the nut a distance at least equal to the thickness of the retainer base 17c.

In assembling this embodiment of my invention, the nuts may be positioned on a flat apertured blank with the bases 8c projecting through the apertures 13c and the rims 6' resting on the top surface of the member 17c and the lugs 6c aligned with the apertures 15c. The sides 16c are then bent transversely to the base 17c so as to loop the top edges of the apertures 15c over the lugs 6c. Where a broader engagement between the nuts and support is desired, the bottom surfaces of the lugs 6c may be made flush with the bottom surface of the hub 8c instead of being axially spaced therefrom.

In the embodiment of my invention illustrated in Figs. 15 to 18, inclusive, the retainer consists of a flat strip 17d slitted parallel to its edges and having the slit edge sections bent upward to form complementary pairs of wall sections 16d forming eyes 15d having open bottoms for the reception of nut lugs.

Stop nuts having threaded bodies 5d and laterally projecting lugs 6d have locking collars 10d secured thereto by the annular shells 9d bonded to the bodies.

The retainer and nuts may be assembled (Fig. 17) by inserting a lug 6d into an eye 15d far enough for the opposite lug 6d to clear the complementary eye 15d and permit the alignment of such lug with the latter eye. The nut is then centered, as shown in Fig. 18, and the inner edges of the wall sections 16d bent toward the base 17d to prevent the removal of the lugs. If desired, the bodies 5d may be provided with axial bodies projecting through the aperture 13d.

Having described my invention, I claim:

1. A fastener comprising a retainer having a base containing an aperture and having bent edges forming eyes communicating with said base aperture, and a nut having a base projecting into said retainer base aperture and lugs disposed in said eyes and having flanges engaging said retainer base between said eyes.

2. A fastener comprising a retainer having an apertured base and walls bent transversely to said base and containing slots, and a nut having a base projecting into said retainer base aperture and lugs disposed in said slots and having flanges engaging said retainer base between said walls.

3. A fastener element comprising a nut having a base projecting from one end thereof, a flange projecting laterally from said nut and spaced axially from the end of said base, and lugs projecting laterally beyond said flange.

4. A fastener comprising a retainer having an apertured base and containing a plurality of eyes having open bottoms and a nut having lugs disposed in said eyes and a flange engaging said base around the aperture therein.

5. A fastener comprising a retainer having an apertured base with bent edges forming eyes having open bottoms, and a nut having a base projecting into said aperture, lugs disposed in said eyes, and a flange seated on said base around said aperture.

KLAS ARENT SWANSTROM.

REFERENCES CITED

The following references are of record in the file of this patent:

UNITED STATES PATENTS

| Number | Name | Date |
|---|---|---|
| 1,103,847 | Schneider | July 14, 1904 |
| 2,026,757 | Swanstrom A. C. | Jan. 7, 1936 |
| 2,243,923 | Swanstrom C. A. | June 3, 1941 |
| 2,286,668 | Brooke | June 16, 1942 |
| 2,335,593 | Howe | Nov. 30, 1943 |
| 2,336,791 | La Barre | Dec. 14, 1943 |